(12) United States Patent
Hipp et al.

(10) Patent No.: US 10,784,547 B2
(45) Date of Patent: Sep. 22, 2020

(54) SYSTEM FOR CONTROLLING THE TEMPERATURE OF AN ELECTRICAL ENERGY STORAGE DEVICE

(71) Applicant: Mahle International GmbH, Stuttgart (DE)

(72) Inventors: Christoph Hipp, Stuttgart (DE); Markus Schauer, Marbach (DE); Raphael Zimmermann, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/632,533

(22) PCT Filed: Jul. 10, 2018

(86) PCT No.: PCT/EP2018/068601
§ 371 (c)(1),
(2) Date: Jan. 20, 2020

(87) PCT Pub. No.: WO2019/016021
PCT Pub. Date: Jan. 24, 2019

(65) Prior Publication Data
US 2020/0203790 A1 Jun. 25, 2020

(30) Foreign Application Priority Data
Jul. 21, 2017 (DE) .................. 10 2017 212 586

(51) Int. Cl.
*H01M 10/663* (2014.01)
*H01M 10/6566* (2014.01)
(Continued)

(52) U.S. Cl.
CPC ......... *H01M 10/663* (2015.04); *F25B 25/005* (2013.01); *H01M 10/625* (2015.04);
(Continued)

(58) Field of Classification Search
None
See application file for complete search history.

(56) References Cited

U.S. PATENT DOCUMENTS

| | | |
|---|---|---|
| 2010/0275619 A1 | 11/2010 | Koetting et al. |
| 2015/0096816 A1 | 4/2015 | Pham et al. |
| 2019/0273296 A1 | 9/2019 | Porras et al. |

FOREIGN PATENT DOCUMENTS

| | | |
|---|---|---|
| DE | 4222837 A1 | 1/1994 |
| DE | 102009058808 A1 | 6/2011 |

(Continued)

OTHER PUBLICATIONS

English abstract for DE-4222837.
(Continued)

*Primary Examiner* — Sarah A. Slifka
(74) *Attorney, Agent, or Firm* — Fishman Stewart PLLC

(57) ABSTRACT

A system for controlling a temperature of an electrical energy storage device may include a coolant circuit through which a coolant is flowable, a refrigerant circuit through which a refrigerant is flowable, a first coolant cooler, a support structure, and at least one molded component. The coolant circuit may be thermally coupled to the electrical energy storage device such that heat is at least one of (i) absorbable from the electrical energy storage device via the coolant and (ii) dissipatable to the electrical energy storage device via the coolant. The refrigerant circuit may be configured as part of a heat pump. The first coolant cooler may be configured to transfer heat between the coolant and the refrigerant. The at least one molded component may be structured separately from the support structure and may include a foamed plastic.

20 Claims, 2 Drawing Sheets

(51) Int. Cl.
*H01M 10/62* (2014.01)
*H01M 10/6556* (2014.01)
*F25B 25/00* (2006.01)
*H01M 10/625* (2014.01)

(52) U.S. Cl.
CPC ... *H01M 10/6556* (2015.04); *H01M 10/6566* (2015.04); *F25B 2500/01* (2013.01)

(56) References Cited

FOREIGN PATENT DOCUMENTS

| | | |
|---|---|---|
| DE | 102016108468 A1 | 12/2016 |
| EP | 2602141 A1 | 6/2013 |
| WO | 2016/133360 | 8/2016 |

OTHER PUBLICATIONS

English abstract for DE-102009058808.
International Search Report for PCT/EP2018/068601, dated Jan. 24, 2019.

SYSTEM FOR CONTROLLING THE TEMPERATURE OF AN ELECTRICAL ENERGY STORAGE DEVICE

CROSS-REFERENCE TO RELATED APPLICATIONS

This application claims priority to International Patent Application No. PCT/EP2018/068601, filed on Jul. 10, 2018, and German Patent Application No. DE 10 2017 212 586.1, filed on Jul. 21, 2017, the contents of both of which are hereby incorporated by reference in their entirety.

TECHNICAL FIELD

The invention relates to a system for controlling the temperature of an electrical energy storage device comprising a coolant circuit. The invention furthermore relates to a motor vehicle equipped with a system of this type.

BACKGROUND

Systems of this type for controlling the temperature of an electrical energy storage device can, for example, additionally have a refrigerant circuit, in which a refrigerant flows and thus forms a part of a heat pump. The coolant can thus additionally be cooled down. The systems thus have a first coolant cooler, which can transfer heat between the coolant and the refrigerant, and a second coolant cooler, which can transfer heat between the coolant and ambient air. Alternatively, the second coolant cooler can be located outside of the system and can thus not be part of the system. In this case, the second coolant cooler is, for example, part of the vehicle-side cooling system. To provide for an on-demand control of the cooling of the coolant and thus of the energy storage device, a coolant control device can be provided, by means of which a flow-through of the first coolant cooler and of the second coolant cooler with coolant can be controlled or regulated. The coolant control device can be arranged, for example, in the system or in the motor vehicle.

A vehicle air conditioning system is known for example from DE 10 2016 1089 468 A1, which is also used to cool an electrical energy storage device. A plurality of cooling modes for the management of the high voltage battery are described thereby.

A system for controlling the temperature of an electrical energy storage device is known from WO 2016/133360 A1, comprising a coolant cycle, in which a coolant flows, and which is thermally coupled to the electrical energy storage device, so that the coolant can absorb heat from the electrical energy storage device or dissipate it to the electrical energy storage device.

A vehicle air conditioning system is known from US 2015/0096816 A1.

If, for example, a system of this type for controlling the temperature of the electrical energy storage device is to be arranged on a vehicle roof, as it is common, for example, in the case of busses or trucks, a weight reduction is particularly favorable for the center of gravity and thus for the driving behavior of the motor vehicle. A weight reduction also increases the load capacity of the motor vehicle.

SUMMARY

The present invention is thus based on the object of providing an improved or at least a different embodiment of a system for controlling the temperature of an electrical energy storage device, which is characterized in particular by a lower weight.

This object is solved according to the invention by means of the subject matter of the independent claim(s). Advantageous embodiments are subject matter of the dependent claim(s).

The invention is based on the basic idea of equipping the system with a support structure and of providing at least one molded component, which is formed separately from the support structure and which is made of a foamed plastic. The molded component formed in this way can define, for example, a flow path and/or a holder for an element of the system. Light and nonetheless precise holders for individual components of the system can be formed with the use of foamed plastic. Light air guides can also be formed easily in this way.

A favorable option provides that the foamed plastic is expanded polypropylene (EPP). This material can be produced cost-efficiently and has excellent properties, in particular with regard to a small weight and a good moldability.

According to the invention it is provided that an element of this type of the system, for which a molded component of this type forms a holder, is a coolant control device and/or the first coolant cooler and/or a refrigerant compressor and/or a coolant pump. A molded component of this type can furthermore form a frame for a refrigerant condenser.

A further favorable option provides that such a molded component has a receptacle for the coolant control device, which has a contour, which is complementary to a contour of the coolant control device. The coolant control device is thus fixed in its position in the molded component in a positive manner. No or at least fewer specific fastening means are thus required at the coolant control device. The coolant control device can, for example, have one or a plurality of valves, which can influence the coolant flow.

A further particularly favorable option provides that the receptacle for the coolant control device thermally insulates the coolant control device. A thermal insulation of this type is present with the use of foamed plastic. An additional cover needs to optionally also be provided, so that the coolant control device is completely enclosed by insulating material. The formation of condensate can be prevented by means of this insulation.

An advantageous solution provides that the coolant control device and the receptacle for the coolant control device are molded in such a way that the coolant control device can only be inserted into the holder in a preterminal position. Incorrect mounting can thus be prevented. Mix-ups and thus faulty connection of inlet and outlet of the coolant control device, for example, can be prevented.

A further advantageous solution provides that a molded component of this type has a receptacle for the first coolant cooler, which has a contour, which is complementary to a contour of the first coolant cooler. A positive holding of the first coolant cooler is thus present, so that said first coolant cooler can be held in the system without additional or at least by means of fewer additional fastening means. The reception in the molded component furthermore at least partially effects a thermal insulation of the first coolant cooler. A further cover can additionally also be provided, so that the first coolant cooler is virtually completely surrounded by thermally insulating material. The condensate formation can thus additionally be prevented or at least reduced at the first coolant cooler.

A further particularly advantageous solution provides that the first coolant cooler and the receptacle for the first coolant cooler are formed in such a way that the first coolant cooler can only be inserted into the holder in a predetermined position. The risk of incorrect connections can be prevented or at least reduced with this securing of the installation position.

A favorable alternative provides that the support structure for fastening the system is formed at an assembly location, the support structure is in particular used to hold the system on a vehicle roof. This means that the support structure is formed to hold the entire weight of the system. Most of, preferably all of the essential elements of the system are furthermore held directly or indirectly via the support structure or on the support structure, respectively.

A further favorable alternative provides that the support structure has a frame. Frame-shaped support structures of this type have a simple and stable setup.

A further particularly favorable alternative provides that the support structure has metal sheet, preferably aluminum sheet. Based on the volume, metal sheet has a high stability, so that the support structure for example of the frames of the structure can be produced cost-efficiently.

A further advantageous option provides that the system has a second coolant cooler, which can transfer heat between the coolant and ambient air, that the system has a coolant control device, by means of which a flow of coolant through the first coolant cooler and the second coolant cooler can be controlled and/or regulated. An on-demand control of the cooling of the coolant and thus of the energy storage device is thus possible.

An advantageous option provides that the coolant control device has a switchover valve, by means of which the coolant circuit can be switched between the first coolant cooler and the second coolant cooler. Depending on the cooling demand for the coolant, a switch can be made back and forth between the more efficient operation, in which the cooling by the refrigerant is forgone, and the effective way, in the case of which the coolant is cooled additionally by the refrigerant. At a time when a small cooling capacity is necessary, the cooling can thus be attained via the second coolant cooler, which emits heat to the air. If a higher cooling capacity is required or if the cooling via the air is not possible due to high external temperatures, respectively, the first coolant cooler can be used, which can cool down the coolant to temperatures, which lie below the ambient temperature, by means of the heat pump in the refrigerant circuit.

It goes without saying that, instead of one switchover valve, the coolant control device can also have a plurality of valves, which can control the flow-through of the first coolant cooler and of the second coolant cooler independently of one another, so that the coolant can certainly also flow through the first coolant cooler and simultaneously through the second coolant cooler.

A further advantageous option provides that the second coolant cooler is formed as flat-tube heat exchanger. Flat-tube heat exchangers of this type have proved their worth for heat exchangers, in the case of which heat from a liquid is to be transferred to ambient air.

A further particularly advantageous option provides that the first coolant cooler is formed as stacked-plate heat exchanger. Stacked-plate heat exchangers of this type have proved their worth for heat exchangers, which are to transfer heat between two liquids.

A favorable solution provides that the refrigerant circuit has a refrigerant condenser, which is preferably formed as flat-tube heat exchanger, that the refrigerant condenser and the second coolant cooler are arranged next to one another, and that a fan is preferably provided, which drives air, wherein the air driven by the fan flows through the refrigerant condenser and through the second coolant cooler. Due to this arrangement, one and the same fan be used to supply fresh air to the refrigerant condenser as well as to the second coolant cooler and can thus cool them. A particularly compact construction can thus be attained.

A further favorable solution provides that the refrigerant circuit has a refrigerant compressor for driving the refrigerant. A heat pump can thus be attained, so that the coolant can be cooled to a temperature, which lies below the external temperature.

An advantageous alternative provides that a molded component of this type forms a frame for the refrigerant condenser. The refrigerant condenser can thus be held by the molded component in a particularly favorable manner. This molded component can thereby additionally also form a part of the air guide.

A further advantageous alternative provides that such a molded component forms a cover for the air guide, at which the fan is held. A holder for the fan as well as an air guide can be attained in this way. The air driven by the fan can thus be systematically guided through the refrigerant condenser and the second coolant cooler. It goes without saying that the fan can be used in suction mode as well as in blowing mode. This means that it makes no difference for the effect for cooling the refrigerant condenser or of the second coolant cooler, whether the air flows through the fan first and then through the element to be cooled or the other way around.

An advantageous solution provides for a heating device, by means of which the coolant can be warmed up, so that the electrical energy storage device can be heated. In the case of low external temperatures, the electrical energy storage device can thus be brought more quickly into a temperature range, which is optimal for the operation.

An advantageous solution provides for the coolant to be a liquid. Advantageously, the coolant has water and an antifreeze. A very high heat transport can be attained with the use of a liquid coolant. The first coolant cooler and the second coolant cooler are accordingly designed for a liquid coolant.

In the description and the enclosed claims, a medium (substance or substance mixture) is to be considered to be liquid or to be a liquid, when the medium is liquid at the operating temperatures, which are to be expected.

The invention is further based on the basic idea of equipping a motor vehicle, which has a drive battery, with a system for controlling the temperature of an electrical energy storage device according to the above description, wherein the system is used to control the temperature of the drive battery of the motor vehicle. The advantages of the system for controlling the temperature of the electrical energy storage device thus transfer to the motor vehicle, to the above description of which reference is made in this respect.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
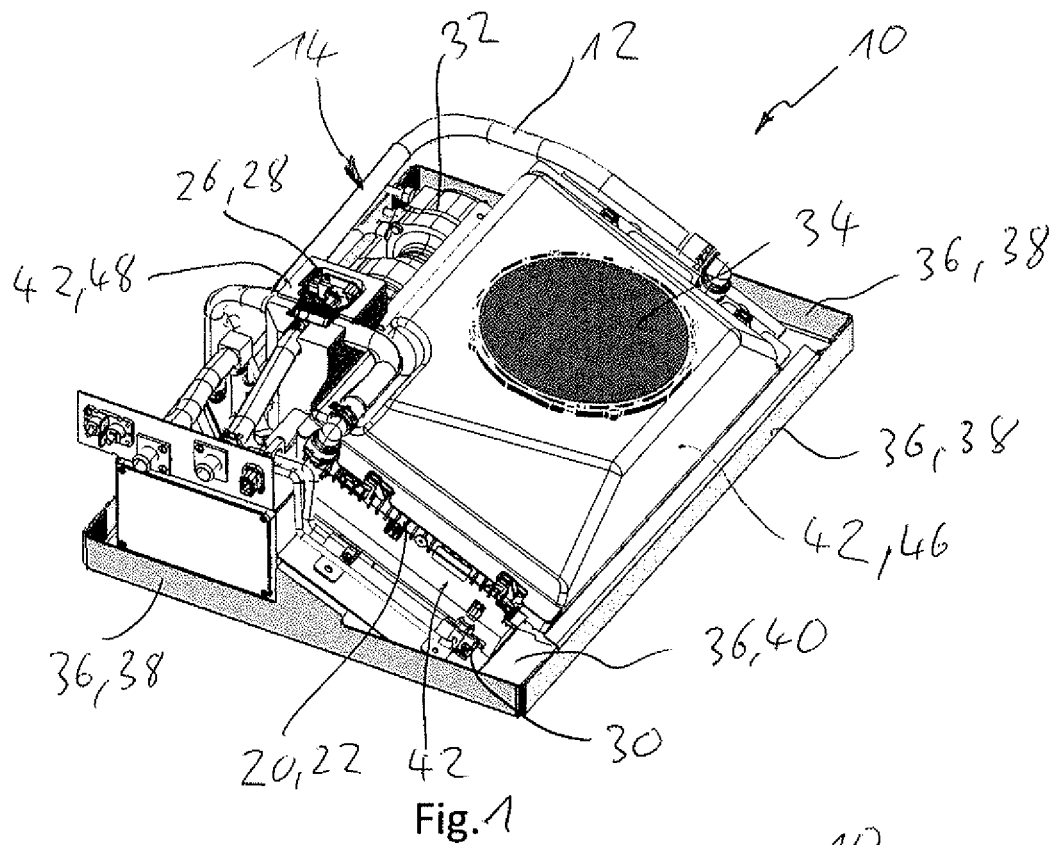
FIG. 1 shows a perspective plan view onto a system for controlling the temperature of an electrical energy storage device, wherein housing parts are hidden.
Figure 2:
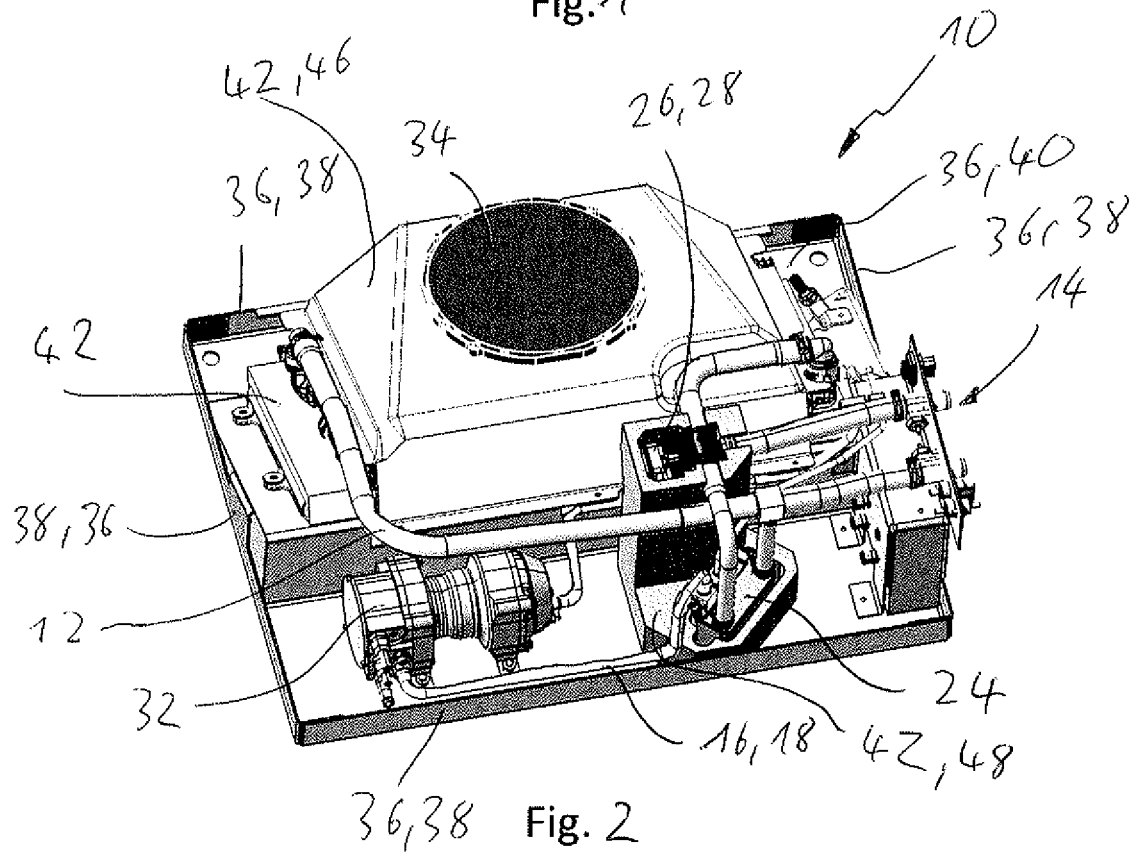
FIG. 2 shows a perspective view onto the system from FIG. 1, wherein the angle of view is rotated.
Figure 3:
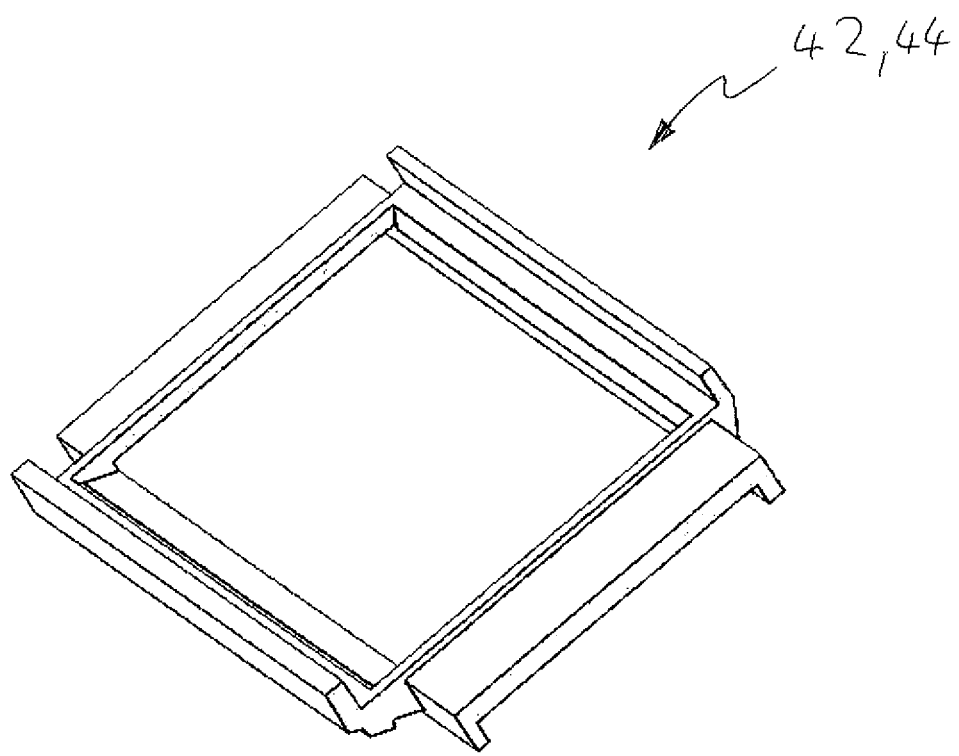
FIG. 3 shows a top view onto a frame for a refrigerant condenser.
Figure 4:
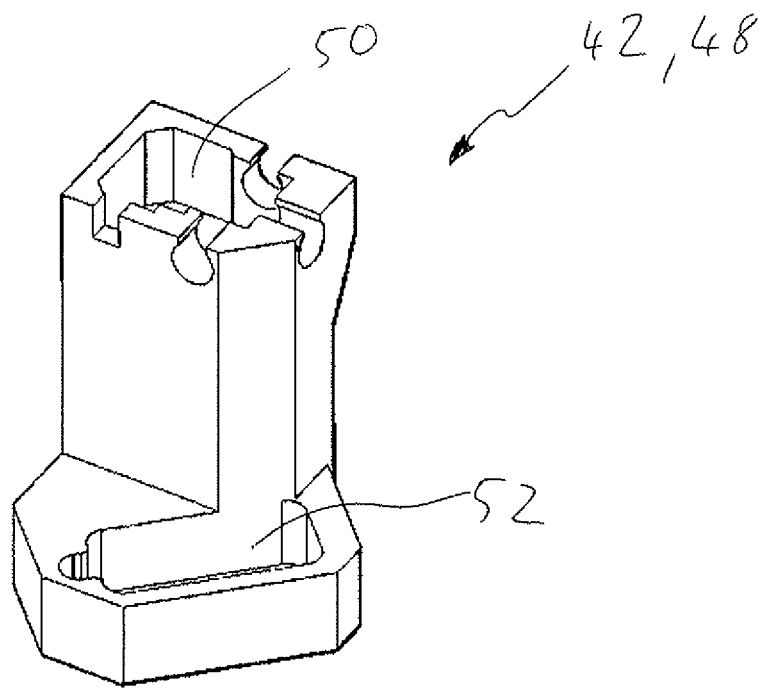
FIG. 4 shows a perspective view onto a molded component comprising a respective receptacle for a coolant control device and a coolant cooler.

A first embodiment of a system 10 for controlling the temperature of a non-illustrated electrical energy storage device illustrated in FIGS. 1 and 2 has a coolant circuit 12, through which a liquid coolant 14 flows, and a refrigerant circuit 16, through which refrigerant 18 flows. The coolant circuit 12 is formed in such a way that it can absorb and discharge heat from the electrical energy storage device. The refrigerant circuit 16 can operate as heat pump and can thus form a temperature sink, the temperature of which lies below the ambient temperature.

The coolant 14 is a liquid. The heat transport capacity of liquid coolant 14 is higher than the heat transport capacity of gaseous coolant 14. The coolant 14 has water, for example. In addition, an antifreeze can be added to the water.

The coolant circuit 12 has a first coolant cooler 24, which is preferably formed as stacked-plate heat exchanger. The coolant 14 and the refrigerant 18 flow through the first coolant cooler 24 at least temporarily. For this purpose, the first coolant cooler 24 has two medium-separated and heat-coupled fluid paths. Heat can thus be transferred from the coolant 14 to the refrigerant 18.

The coolant circuit 12 furthermore has a second coolant cooler 20, which is preferably formed as flat-tube heat exchanger 22. Coolant 14 and air can flow through the second coolant cooler 20. The second coolant cooler 20 has two medium-separated and heat-coupled fluid paths, so that heat can be dissipated from the coolant 14 to the ambient air.

Two options are thus available for cooling the coolant 14 and thus for discharging the heat from the electrical energy storage device. On the one hand, the heat can be dissipated to the ambient air with the help of the second coolant cooler 20. By means of the first coolant cooler 24, on the other hand, the heat can be dissipated to the refrigerant 18, which, as will be shown below, also dissipates the heat to the ambient air. However, a temperature level, which lies below the external temperature/ambient temperature, can be attained by means of the refrigerant 18.

In addition to this, a heating device can also be provided, by means of which heat can be supplied to the coolant 14, so that the electrical energy storage device can be heated.

The cooling via the second coolant cooler 20 thus has a better efficiency than the cooling via the first coolant cooler 24. The cooling via the first coolant cooler 24 can attain lower temperatures than the cooling via the second coolant cooler 20. A coolant control device 26 is thus provided, which controls and/or regulates the coolant flow through the first coolant cooler 24 and through the second coolant cooler 20.

The coolant control device 26 has, for example, at least one valve, preferably a switchover valve 28, by means of which the coolant flow between the first coolant cooler 24 and the second coolant cooler 20 can be switched over. It goes without saying that the coolant control device 26 can also have two separate valves, which can each control and/or regulate the coolant flow through the first coolant cooler 24 and through the second coolant cooler 20 independently of one another.

The refrigerant circuit 16 has a refrigerant condenser 30, which is preferably formed as flat-tube heat exchanger. Heat can be emitted from the refrigerant 18 to the ambient air by means of the refrigerant condenser 30, so that the refrigerant can condense in the refrigerant condenser 30.

To drive the refrigerant 18 in the refrigerant circuit 16, a refrigerant compressor 32 is preferably provided. At least one expansion valve is preferably furthermore provided, through which the refrigerant 18 is guided before it flows into the first coolant cooler 24, so that the temperature of the refrigerant 18 in the first coolant cooler 24 is reduced, so that the refrigerant 18 can absorb heat from the coolant 14.

The system 10 furthermore has a fan 34, which can generate an air flow, in order to absorb heat from the refrigerant condenser 30 and the second coolant cooler 20. For this purpose, the refrigerant condenser 30 and the second coolant cooler 20 are preferably arranged next to one another, in particular parallel to one another.

The system 10 has a support structure 36, at which the essential components of the system 10 are held indirectly or directly. The support structure has a frame 38, which is preferably formed to be rectangular. A non-continuous bottom 40 is held on the frame. An opening in the bottom 40 serves as air opening, through which the air for the fan 34 is sucked in or blown off. The system 10 furthermore has a plurality of housing walls 41, which close the system 10 against the environment.

The system 10 has at least one, for example three, molded components, which are made of a foamed plastic. Such a foamed plastic can be, for example, expanded polypropylene (EPP). These foamed plastics have a low weight and a good moldabilty.

A first molded component 42 of this type is formed as frame 44 for the refrigerant condenser 30. The refrigerant condenser 30 can be inserted into the frame 44. The frame 44 is preferably formed in such a way that the second coolant cooler 20 can also be held on the frame. The air flow can thus be guided through the refrigerant condenser 30 and through the second coolant cooler 20.

A molded component 42 of this type is furthermore formed as cover 46 for the fan 34, so that the air sucked in by the fan 34 initially flows through the refrigerant condenser 30 and the second coolant cooler 20. A reverse flow direction, in the case of which the air flows from the fan to the refrigerant condenser 30 and the second refrigerant cooler 20 is also possible.

Finally, a molded component 42 of this type is formed as holder 48 for the coolant control device 26 and the first coolant cooler 24. The holder 48 respectively has a receptacle 50 for the coolant control 26 and a receptacle 52 for the first coolant cooler 24.

The receptacle 50 has a contour, which is formed complementary to the contour of the coolant control device 26. The receptacle 50 and the coolant control device 26 are preferably molded in such a way that the coolant control device 26 can only be inserted into the receptacle 50 in a provided installation position. The exact installation position of the coolant control device 26 is thus provided by the holder 48 and the receptacle 50, so that a faulty installation of the coolant control device 26 is prevented or at least made more difficult.

The receptacle 50 thus at least partially surrounds the coolant control device 26, so that the receptacle 50 thermally insulates the coolant control device 26. To improve the thermal insulation, a cover can additionally be provided, which is preferably also made of foamed plastic.

The receptacle 52 of the first coolant cooler 24 has a contour, which is formed complementary to the contour of the first coolant cooler 24, so that the first coolant cooler 24 can be received in the receptacle 52 in a positive manner. The receptacle 52 and the first coolant cooler 24 are preferably formed in such a way that the first coolant cooler 24 can only be inserted into the receptacle 52 in a predetermined installation position. A faulty insertion of the first coolant cooler 24 can thus be prevented or can at least be made significantly more difficult.

The holder 48 can either be formed in multiple pieces or, as illustrated for example in the figures, in one piece, so that the receptacle 50 for the coolant control device 26 and the receptacle 52 for the first coolant cooler 24 are held in a common molded component 42.

The invention claimed is:

1. A system for controlling a temperature of an electrical energy storage device, comprising:
   a coolant circuit through which a coolant is flowable, the coolant circuit thermally coupled to the electrical energy storage device such that heat is at least one of (i) absorbable from the electrical energy storage device via the coolant and (ii) dissipatable to the electrical energy storage device via the coolant;
   a refrigerant circuit through which a refrigerant is flowable, the refrigerant circuit configured as part of a heat pump;
   a first coolant cooler configured to transfer heat between the coolant and the refrigerant;
   a support structure;
   at least one molded component structured separately from the support structure, the at least one molded component including a foamed plastic; and
   wherein the at least one molded component is at least one of:
     configured to define an air flow path;
     configured as a holder for a coolant control device;
     configured as a holder for the first coolant cooler;
     configured as a holder for a refrigerant compressor;
     configured as a holder for a coolant pump; and
     configured as a frame for a refrigerant condenser.

2. The system according to claim 1, wherein the at least one molded component includes a receptacle for a coolant control device, and wherein the receptacle has a contour configured complementary to a contour of the coolant control device.

3. The system according to claim 2, wherein the coolant control device and the receptacle for the coolant control device are molded such that the coolant control device is only insertable into the receptacle in a provided position.

4. The system according to claim 1, wherein the at least one molded component has a receptacle for the first coolant cooler, and wherein the receptacle has a contour configured complementary to a contour of the first coolant cooler.

5. The system according to claim 4, wherein the first coolant cooler and the receptacle for the first coolant cooler are molded such that the first coolant cooler is only insertable into the holder in a provided position.

6. The system according to claim 1, wherein at least one of:
   the support structure is structured and arranged to secure the system at an assembly location; and
   the support structure includes a frame.

7. The system according to claim 1, wherein the support structure includes a metal sheet.

8. The system according to claim 7, wherein the metal sheet is an aluminum sheet.

9. The system according to claim 1, further comprising:
   a second coolant cooler configured to transfer heat between the coolant and ambient air; and
   a coolant control device configured to at least one of control and regulate a flow of coolant through the first coolant cooler and the second coolant cooler.

10. The system according to claim 9, wherein the refrigerant circuit includes a refrigerant condenser structured as a flat-tube heat exchanger.

11. The system according to claim 9, wherein the coolant control device includes a switchover valve via which the coolant circuit is switchable between the first coolant cooler and the second coolant cooler.

12. The system according to claim 11, further comprising a fan, wherein:
   the refrigerant circuit includes a refrigerant condenser structured as a flat-tube heat exchanger;
   the refrigerant condenser and the second coolant cooler are arranged next to one another; and
   the fan is structured and arranged to drive air through the refrigerant condenser and through the second coolant cooler.

13. The system according to claim 9, further comprising a fan, wherein:
   the refrigerant circuit includes a refrigerant condenser;
   the refrigerant condenser and the second coolant cooler are arranged next to one another; and
   the fan is structured and arranged to drive air through the refrigerant condenser and through the second coolant cooler.

14. The system according to claim 13, wherein at least one of:
   the at least one molded component is configured as a frame for the refrigerant condenser; and
   the at least one molded component is configured as a cover for an air guide, at which the fan is held.

15. The system according to claim 13, wherein the at least one molded component is configured as a frame for the refrigerant condenser.

16. The system according to claim 13, wherein the at least one molded component is configured as a cover for an air guide, at which the fan is held.

17. The system according to claim 1, wherein the coolant is a liquid.

18. The system according to claim 1, wherein the support structure is structured and arranged to secure the system at an assembly location.

19. The system according to claim 1, wherein the support structure includes a frame.

20. A motor vehicle, comprising a drive battery and a system for controlling a temperature of an electrical energy storage device according to claim 1, wherein the temperature of the drive battery is controlled by the system.

* * * * *